United States Patent
Agrawal et al.

(12) 
(10) Patent No.: US 9,027,143 B1
(45) Date of Patent: May 5, 2015

(54) SYSTEM AND METHOD FOR MULTIPRONGED AUTHENTICATION

(75) Inventors: Sunil C. Agrawal, Milpitas, CA (US); Joseph D. Steele, Danville, CA (US)

(73) Assignee: Adobe Systems Incorporated, San Jose, CA (US)

(*) Notice: Subject to any disclaimer, the term of this patent is extended or adjusted under 35 U.S.C. 154(b) by 1503 days.

(21) Appl. No.: 12/548,310

(22) Filed: Aug. 26, 2009

(51) Int. Cl.
- G06F 7/04 (2006.01)
- G06F 17/30 (2006.01)
- H04N 7/16 (2011.01)
- G06F 21/44 (2013.01)
- G06F 21/10 (2013.01)
- H04N 21/25 (2011.01)

(52) U.S. Cl.
CPC ............... *G06F 21/44* (2013.01); *G06F 21/10* (2013.01); *H04N 21/25* (2013.01)

(58) Field of Classification Search
None
See application file for complete search history.

(56) References Cited

U.S. PATENT DOCUMENTS

| | | | |
|---|---|---|---|
| 6,668,325 B1 | 12/2003 | Collberg et al. | |
| 7,206,941 B2 * | 4/2007 | Raley et al. | 713/193 |
| 7,237,123 B2 | 6/2007 | LeVine et al. | |
| 7,263,722 B1 | 8/2007 | Luo et al. | |
| 7,296,154 B2 * | 11/2007 | Evans et al. | 713/169 |
| 2007/0198858 A1 * | 8/2007 | Kim et al. | 713/193 |

OTHER PUBLICATIONS

Sethi, "Digital Rights Management and Code Obfuscation," Thesis presented to University of Waterloo, 2003, pp. 43-51.*
Wikipedia, "Windows Genuine Advantage," last modified Aug. 24, 2009.
"Windows Media DRM FAQ," Windows Media, Oct. 2005.
Wikipedia, "BD+," last modified Aug. 9, 2009.

* cited by examiner

*Primary Examiner* — Nadia Khoshnoodi
(74) *Attorney, Agent, or Firm* — Kilpatrick Townsend & Stockton LLP

(57) ABSTRACT

Various embodiments of a system and method for multipronged authentication are described. Embodiments may include a client system that implements a runtime component configured to consume content. The client system may be configured to implement a digital rights management component configured to perform one or more cryptographic operations and also authenticate the runtime component. The client system may receive encrypted content from a remote computer system and receive a given authentication component from a remote computer system; that authentication component may be configured to authenticate the runtime component. The client system may, based on authentication of the runtime component by both the digital rights management component and the given authentication component, decrypt at least a portion of the encrypted content. In this way, the client system may ensure that decryption of the encrypted content may occur only if multiple components authenticate the runtime component, according to some embodiments.

50 Claims, 6 Drawing Sheets

SYSTEM AND METHOD FOR MULTIPRONGED AUTHENTICATION

BACKGROUND

1. Field of the Invention

The present invention is directed to computer systems and other electronic devices. More particularly, it is directed to authenticating one or more elements of such systems.

2. Description of the Related Art

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized entities and/or controlling the manner in which such entities access electronic content.

SUMMARY

Various embodiments of a system and method for multipronged authentication are described. Embodiments may include a client system configured to implement a runtime component in memory of the client system. The runtime component may be configured to consume content (e.g., video-, audio- or text-based content). The client system may also be configured to implement a digital rights management component in memory of the clients system. The digital rights management component may be configured to perform one or more cryptographic operations, such as encryption or decryption. The digital rights management component may also be configured to authenticate the runtime component. The client system may be configured to receive encrypted content from a remote computer system (e.g., encrypted versions of video, audio, text, etc.). The client system may also be configured to receive a particular authentication component from a remote computer system. The particular authentication component may also be configured to authenticate the runtime component. The client system may be configured to, based on authentication of the runtime component by both the digital rights management component and the particular authentication component, decrypt at least a portion of the encrypted content. In this way, the client system may be configured to ensure that decryption of the encrypted content may occur only if multiple components (e.g., the digital rights management component and the received authentication component) authenticate the runtime component, according to some embodiments. The client system may also be configured to consume (e.g., present, play, display, render, etc.) at least some of the decrypted content on the client system.

Embodiments may also include a server system configured to provide encrypted content to a remote computer system that includes a runtime component configured to consume content (e.g., video-, audio- or text-based content). The remote computer system may also include a digital rights management component configured to perform one or more cryptographic operations including decrypting at least a portion of the encrypted content in response to authenticating the runtime component. The server system may also be configured to provide a particular authentication component to the remote computer system. The particular authentication component may be configured to, in response to authenticating the runtime component, cause at least a portion of the encrypted content to be decrypted. In various embodiments, the encrypted content provided to the remote computer system by the server system may be encrypted such that the entirety of the encrypted content cannot be decrypted on the remote computer system without the remote computer system using both the digital rights management component and the authentication component to authenticate the runtime component. In this way, the server system may be configured to ensure that decryption of the encrypted content may occur only if multiple components (e.g., the digital rights management component and the received authentication component) authenticate the runtime component, according to some embodiments.

Figure 1:
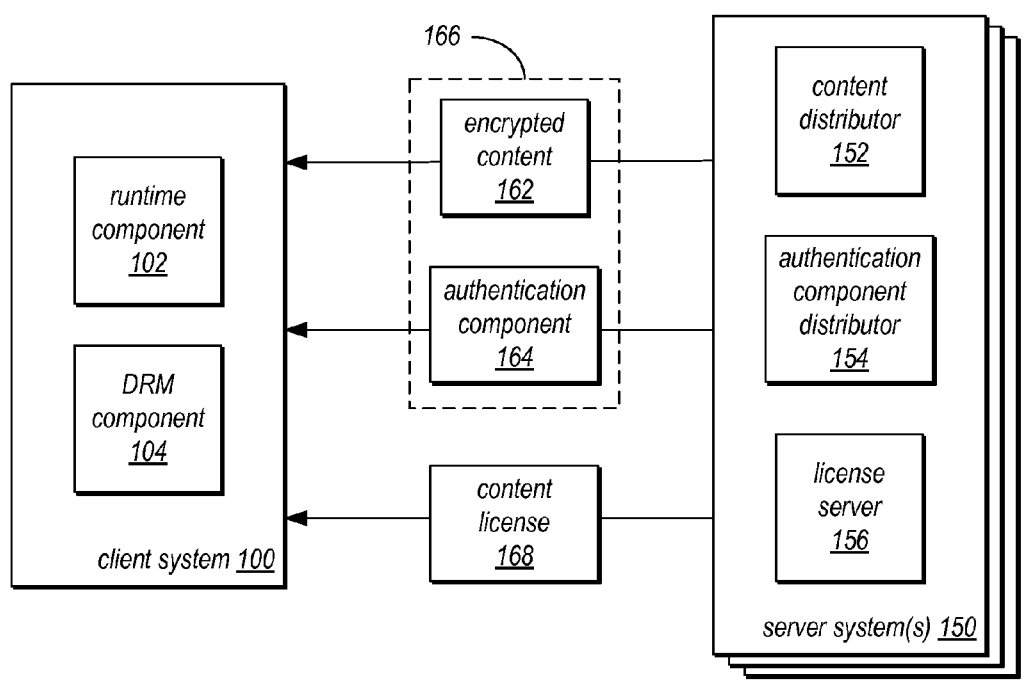
FIG. 1 illustrates a block diagram of a client system and one or more server systems configured to implement various embodiments of the system and method for multipronged authentication.

While the system and method for multipronged authentication is described herein by way of example for several embodiments and illustrative drawings, those skilled in the art will recognize that the system and method for multipronged authentication is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for multipronged authentication as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for multipronged authentication are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Note that the description presented herein may include one or more references to a one-way function or a cryptographic hash function, either of which may be referred to herein as simply a hash function. Generally speaking, a cryptographic hash function may operate on a block of data in order to return a fixed-size bit string (e.g., the hash value, or simply "hash") such that an accidental or intentional change to the block of data will change the hash value (although variations thereof may be utilized in various embodiments). In some cases, the aforesaid block of data may be referred to as a "message" and the corresponding hash value may be referred to as the "message digest." In various embodiments, a hash function may include any function or set of operations operating as described above. Examples of hash functions include, but are not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPEMD-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions. In various embodiments, the DRM component and/or the authentication components described herein may be configured to utilize one or more cryptographic hash functions to perform cryptographic operations.

Various embodiments include various encryption and/or decryption keys, any of which may be generated via a key derivation function (KDF). Some key derivation functions may include one or more iterations or instances of hash functions and/or other cryptographic operations in order to generate an encryption or decryption key. Examples of key derivation functions may include but are not limited to any key derivation functions specified by Public Key Cryptography Standards (PKCS) (e.g., PKCS-5) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client") and/or one or more server systems (or simply "servers"). It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "digital content," "content item(s)," "content data," "content information" or simply "data" or "information"). In some embodiments, content may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV or .F4V) format or some other video file format whether such format is presently known or developed in the future.

In various embodiments, content may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

In various instances, this detailed disclosure may refer to consuming content or to the consumption of content, which may include accessing content, rendering content, displaying content, playing content, and generating, storing or accessing an unencrypted version of content, among other things. In some cases, consuming content may include generating a human-perceptible version of the content (e.g., displaying video on a display, generating audio through a transducer or speaker, etc) from a stored representation of content within memory of a computer system. In some cases, the particular term utilized to convey the consumption of content may be dependent on the context in which it is used. For example, consuming video may also be referred to as viewing or playing the video. In another example, consuming audio may also be referred to as listening to or playing the audio.

Figure 6:
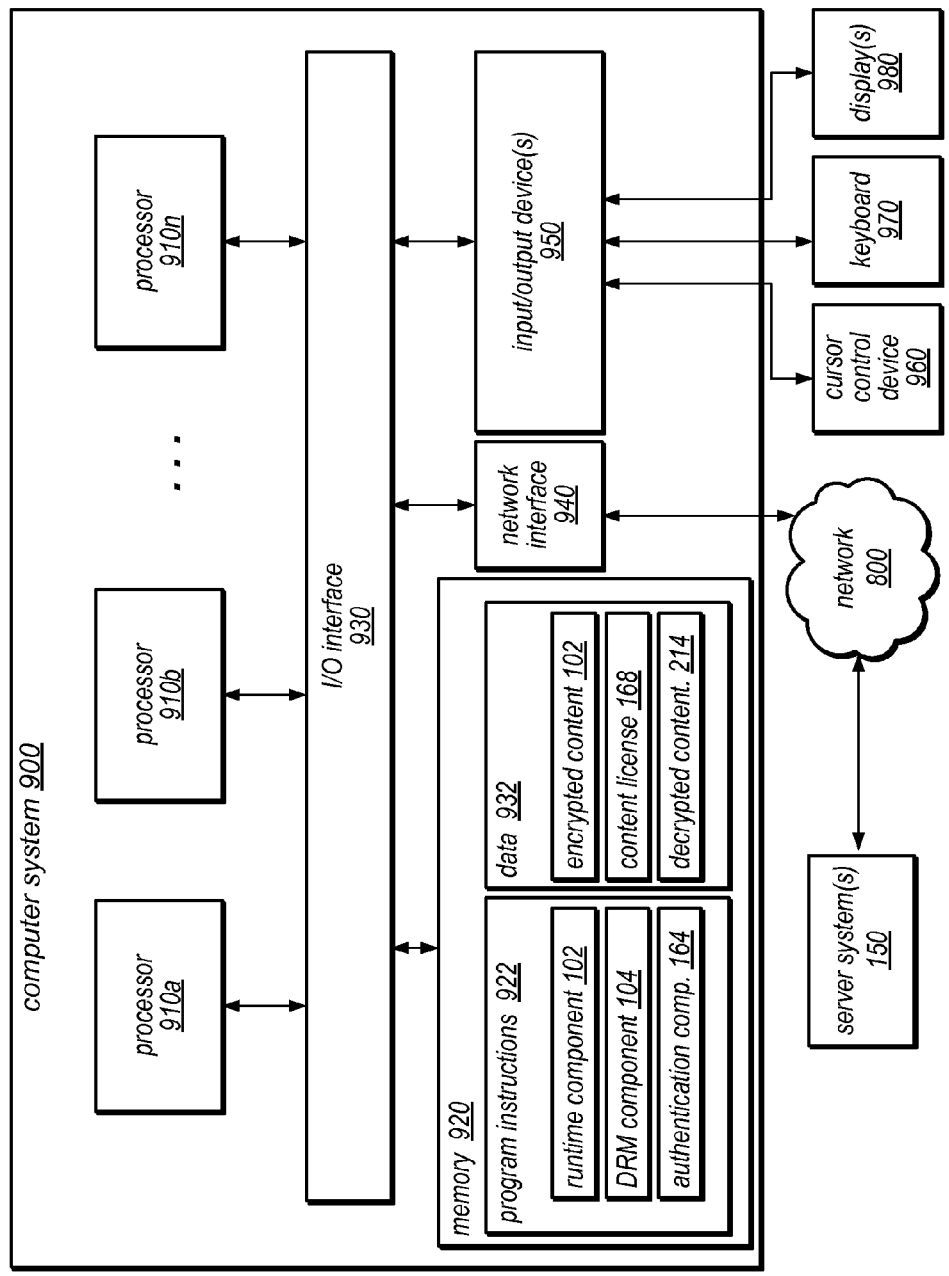
FIG. 6 illustrates an example computer system suitable for implementing various components of the system and method for multipronged authentication, according to various embodiments.

In various instances, this detailed description may refer to a device configured to perform content consumption. In various embodiments, such a device may include but is not limited to a computing system (e.g., a desktop or laptop computer), a digital audio or multimedia player (e.g., an MP3 player), a personal digital assistant (PDA), a mobile phone, a smartphone, an e-book reader, a digital photo frame, a netbook, camera, set top box, a video game console, or any other electronic device or system configured to access, view, read, write, and/or manipulate any of the content data described herein. Any of such devices may be implemented via a computer system similar to the computer system described with respect to FIG. 6.

Note that in various instances the description presented herein may refer to a given entity performing some action. It should be understood that this language may in some cases mean that a system (e.g., a computer system) owned and/or controlled by the given entity is actually performing the action.

Note that in various instances the description presented herein may refer to a public key being associated with a private key or a public key corresponding to private key. It should be understood that such statements may mean that such a public key forms a public key—private key pair with such a private key. Additionally, in some cases, a public key—private key pair may be referred to as simply a "key pair." Note that in various embodiments, public key—private key pairs may be generated via one or more iterations of cryptographic hash functions and/or one or more iterations of key generation functions. For symmetric encryption, references to a decryption key corresponding to an encryption key may mean that the decryption key is the same as the encryption key. For asymmetric encryption, references to a decryption key corresponding to an encryption key may mean that the decryption key is a private key and the encryption key is the public key that forms a public key—private key pair with the decryption key. References to encryption may include asymmetric encryption, symmetric encryption, another type of encryption, or some combination thereof.

INTRODUCTION

Various portions of the system and method for multi-pronged authentication may be implemented on one or more client and server systems, such as client system 100 and server system(s) 150 of FIG. 1. Client system 100 may include a runtime component 102 configured to consume content. Examples of content consumption include the playing of a video or audio file on the client system or any other example of content consumption described above. In some embodiments, the runtime component may be configured to provide a user interface that includes various controls for the consumption of content. For instance, the runtime component may be configured to provide controls for playing, pausing, fast forwarding, rewinding or otherwise controlling content. In various embodiments, runtime component 102 may be configured to consume content by decoding the content according to one or more audio or video codecs (e.g., H.264 or VP6). Examples of a runtime component 102 include but are not limited to Adobe® Flash® Player and Adobe® AIR™.

Client system 100 also includes a digital rights management component, which is illustrated as DRM component 104. In the illustrated embodiment, DRM component 104 may be configured to perform one or more cryptographic operations, including but not limited to those related to the consumption of content via runtime component 102. In various embodiments, the cryptographic operations performed by the DRM component may include but are not limited to content license acquisition, content key acquisition, and content decryption. In embodiments where runtime component 102 and DRM component 104 are implemented as computer-executable instructions (e.g., executable software modules), the size of the data representing DRM component 104 may in some cases be smaller than that of runtime component 102; such a configuration may in some cases facilitate the process of updating or replacing the DRM component if necessary.

Figure 2:
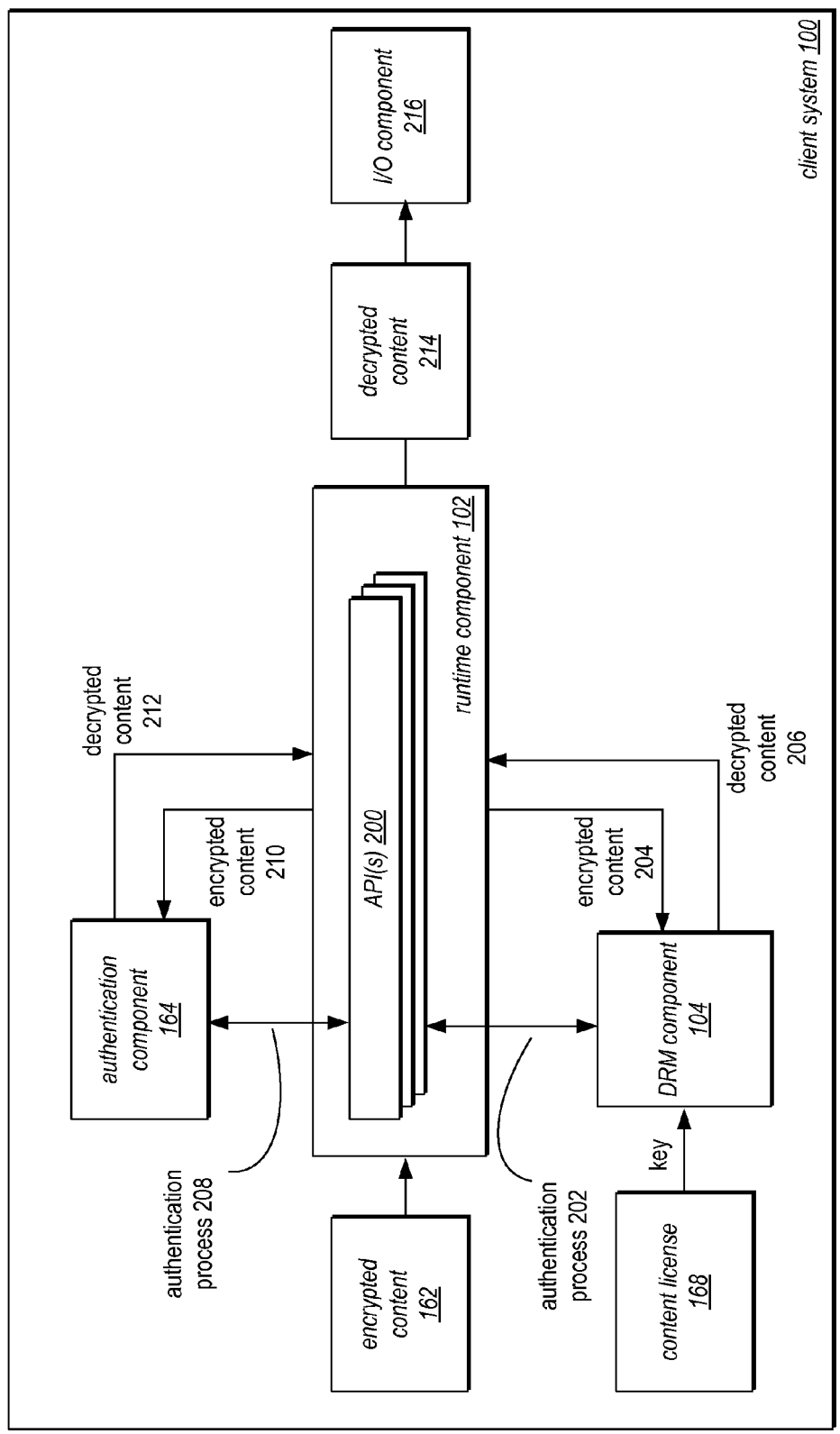
FIG. 2 illustrates a block diagram of the components and data of a client system including a DRM component and an authentication component, according to various embodiments.

In various embodiments, as described in more detail below with respect to FIG. 2, DRM component 104 may be configured to perform an authentication process in order to authenticate runtime component 102. Authenticating the runtime component may include determining that the runtime component is a valid runtime component as specified by one or more criteria, which are described in more detail below with respect to FIG. 2. In various embodiments, the DRM component may be configured to, in response to authenticating runtime component 102, decrypt one or more portions of content and provide such content to runtime component 102. For instance, subsequent to the authentication of the runtime component, the DRM component may consider the runtime component to be a trusted element that is eligible to receive decrypted content. If authentication of the runtime component fails, the DRM component may consider the runtime component to be an untrusted element that is not eligible to receive decrypted content. An example of DRM component 104 includes but is not limited to Adobe® DRM Client for Flash® Player.

In various embodiments, the above-described techniques combined with those described below may in many cases thwart an attacker's ability to spoof the runtime component. In one example of such an attack, an attacker might create a malicious application that imitates a legitimate runtime component in order to trick the DRM component into decrypting encrypted content and providing the decrypted content to the malicious application. If such an attack were successful, the attacker might use the malicious application to bypass DRM usage rules placed on the content. For instance, one type of usage rule might prohibit transferring content to another computer system. The malicious application might be configured to ignore such restrictions on content distribution and allow the unencrypted content to be transferred to other computer systems (e.g., computer systems of a peer-to-peer file sharing network).

To thwart such an attack (or similar attacks), various embodiments may utilize a multipronged authentication of the runtime component. One aspect of such embodiments may include the authentication of the runtime component by the DRM component as described above (and as described in more detail below). Another aspect of such embodiments may include the authentication of the runtime component by one or more authentication components that are received by the client system from a remote computer system. In various embodiments, such an authentication component may be received at runtime (e.g., while runtime component 102 or DRM component 104 are executing). One example of such an authentication component is illustrated as authentication component 164, which is described in more detail below. In some embodiments, authentication components may be represented by data or information that may be interpreted and/or executed by the runtime component described herein (e.g., authentication components may be expressed in executable instructions or bytecode). In some embodiments, authentication components may be software or hardware modules that do not require a runtime component in order to operate.

Authentication component 164 may be acquired by client system 100 according to a variety of techniques in various embodiments. In some embodiments, runtime component 102 may obtain encrypted content 162 and a corresponding authentication component 164 as part of the same content stream 166. In some embodiments, element 166 may represent a data file that includes both the encrypted content 162 and a corresponding authentication component 164. In various embodiments, content streams and/or data files may adhere to the SWF file format, instances of which may be consumed or interpreted by Adobe® Flash® Player and/or Adobe® AIR™. In some embodiments, encrypted content 162 may include a network address specifying where the corresponding authentication component may be retrieved from. For instance, metadata of the encrypted content may specify such a network address. Examples of such a network address include but are not limited to a Uniform Resource Locator (URL), Uniform Resource Identifier (URI), or some other network-based address specifying a network location of an authentication component. In various embodiments, the runtime component may determine the aforesaid network address from the content and request and/or retrieve the authentication component located at such network address. The operation of authentication component 164 is described in more detail below with respect to FIG. 2.

In various embodiments, one or more server system(s) 150 may be configured to implement content distributor 152, authentication component distributor 154 and license server 156. For instance, in some embodiments each of the aforesaid components may be implemented on the same server system. In other embodiments, each of the aforesaid components may be implemented on a different server system. In various embodiments, content distributor 152 may be configured to provide encrypted content, such as encrypted content 162, to one or more client systems, such as client system 100. In various embodiments, authentication component distributor 154 may be configured to distribute authentication components, such as authentication component 154, to client systems, such as client system 100. In various embodiments, license server 156 may be configured to provide a content license, such as content license 168, to one or more client systems, such as client system 100.

In various embodiments, DRM component 104 may utilize content license 168 to decrypt a portion of encrypted content 162 and/or enforce one or more usage rules. For instance, in some embodiments, content license 168 may include a decryption key for decrypting one or more portions of encrypted content 162. DRM component 104 may be configured to utilize that decryption key to decrypt such portions of encrypted content 162. In various embodiments, DRM component 104 may be configured to enforce usage rules on the access of encrypted content 162. In general, usage rules may include any restrictions on the use or access of the content including but not limited to restricting the access of content to a particular time period, and restricting the actions (e.g., view, copy, save, distribute, etc.) that can be performed with respect to the content. In other embodiments, DRM component may pass such usage rules to runtime component 102 (or runtime component 102 may access such usage rules directly) to enable the runtime component to enforce the usage rules on the content.

Multipronged Authentication of the Runtime Component

As described above, to thwart malicious activities including but not limited to spoofing attacks on the runtime component, various embodiments may utilize a multipronged authentication of the runtime component. In some embodiments, the multipronged authentication may include decrypting the encrypted content and/or consuming such content only after both DRM component 104 and authentication component 164 authenticate runtime component 102 (e.g., only after determining that runtime component 102 is trusted). By utilizing the multipronged authentication described herein, client system 100 may in some cases be configured to quickly and efficiently overcome a security breach. In one example, if an attacker were to somehow successfully spoof runtime component 102 to both the DRM component and authentication component 164, client system 100 may in various embodiments update the authentication component with a new authentication component that has not been compromised.

To support the multipronged authentication described herein, the encrypted content 162 that is provided to the client system by content distributor 152 may be encrypted in such a way that the entirety of the content (e.g., the whole video file, or the whole audio file, etc.) cannot be decrypted by only using one of the DRM component and the authentication component. In other words, in some embodiments, the manner in which the encrypted content is encrypted requires decryption of the content by both the authentication component 164 and the DRM component 104. In one example, the encrypted content 162 that is provided to the client system by content distributor 152 may include multiple distinct portions of content (e.g., distinct groups of one or more blocks). In various embodiments, one portion of the content may be decrypted with a first key and a second portion of the content may be decrypted with a second key. In one non-limiting example, every hundredth block of the encrypted content may be encrypted with a different encryption key that is different than the encryption key used to encrypt all of the other blocks of the encrypted content. In various embodiments, DRM component 104 may receive one or more decryption keys (e.g., one or more keys from content license 168) for decrypting one or more portions of encrypted content 162, and authentication component 164 may receive one or more other decryption keys for decrypting one or more other portions of encrypted content 162. For instance, in the context of the aforesaid non-limiting example, authentication component may receive one or more decryption keys for decrypting every hundredth block of encrypted content 162, and DRM component 104 may receive one or more decryption keys for decrypting the remaining blocks of the encrypted content.

In various embodiments, authentication component 164 may be configured to decrypt one or more portions of the encrypted content if and only if the authentication component authenticates the runtime component (described in more detail below). Likewise, in various embodiments, DRM component 104 may be configured to decrypt one or more portions of the encrypted content if and only if the DRM component 104 authenticates the runtime component. By encrypting the content as described above and utilizing multiple authentication elements as described above, the client system in various embodiments may be configured such that the entirety of encrypted content 162 will be decrypted if and only if both authentication component 164 and DRM component 104 authenticate runtime component 102.

In various embodiments, runtime component 102 may be configured to receive encrypted content 162. Runtime component 102 may submit at least a portion of encrypted content 162 to DRM component 104, as illustrated by encrypted content 204. In various embodiments, this submission may be a request to decrypt the submitted content. Runtime component 102 may also submit at least a portion of the encrypted content to authentication component 164. This submission may also be a request to decrypt the submitted content. In various embodiments, each of DRM component 104 and authentication component 164 may be configured to enforce a requirement that runtime component 102 be authenticated prior to decrypting the respective content submitted by the runtime component. In various embodiments, the authentication component and the DRM component may perform different authentication processes in order to determine whether the runtime component is to be authenticated, as described in more detail below.

As a precursor to the description of the distinct authentication processes performed by the authentication component and the DRM component, application programming interface(s) (APIs) 200 are described. As illustrated, runtime component 102 may include one or more APIs 200, each of which may in some embodiments define the manner in which an element may request services from libraries (subroutines, classes, functions, etc.) provided by the runtime component. In various embodiments, each API of runtime component 102 may be configured to respond to requests or calls in or requests to the API. Examples of APIs include but are not limited to cryptographic APIs, windowing APIs, and networking APIs. Examples of APIs 200 may include but are not limited to Adobe® ActionScript® 1.0 APIs, Adobe® ActionScript® 2.0 APIs, and Adobe® ActionScript® 3.0 APIs. In various embodiments, for at least some requests (or calls) sent to APIs 200, one or more expected responses may be determined by the authentication component 164 and/or DRM component 104. As described in more detail below with respect to authentication processes, authentication component 164 and DRM component 104 may be configured to use knowledge of such expected responses in order to determine whether runtime component 102 is a valid runtime component.

DRM component 104 may be configured to decrypt encrypted content 204 to generate decrypted content 206. For instance, DRM component may obtain a decryption key from content license 168 and decrypt a portion of encrypted content 162 with such key. In various embodiments, DRM component 104 may perform such decryption in response to authenticating runtime component 102 (e.g., in response to determining that runtime component 102 is valid or authentic). If the runtime component 102 is determined to be not authentic (e.g., invalid, untrusted, etc.), the DRM component may not provide decrypted content 206 to the runtime component. In various embodiments, the DRM component may determine, for each of one or more API requests, an expected response to that API request. To perform authentication process 202, DRM component 104 may submit each of the one or more API requests to the respective API of runtime component 102, as demonstrated in the illustrated embodiment. As part of authentication process 202, DRM component 104 may be configured to receive one or more responses to those requests. As part of authentication process 202, DRM component 104 may in various embodiments determine whether the one or more API response match the one or more expected responses described above. In response to determining that each of the one or more API responses matches each of the respective expected responses, DRM component 104 may determine that runtime component 102 is authenticated (e.g., valid or trusted). In response to determining that one or more of the API responses do not match the respective expected responses, DRM component 104 may determine that runtime component 102 is not authenticated (e.g., not valid, unauthentic, untrusted, etc.).

In some embodiments, as an alternative to the API check described above (or in addition to the API check), DRM component may determine whether the runtime component 102 holds a particular cryptographic key. In one example, the DRM component may engage the runtime component in a handshaking protocol to determine whether the particular cryptographic key is held by the runtime component. In response to determining that the particular cryptographic key is held by the runtime component, DRM component 104 may determine that runtime component 102 is authenticated. In response to determining that the particular cryptographic key is not held by the runtime component, DRM component 104 may determine that runtime component 102 is not authenticated.

Authentication component 164 may be configured to decrypt encrypted content 210 to generate decrypted content 212. For instance, authentication component may include a decryption key for decrypting a particular portion of encrypted content 162. In various embodiments, authentication component 164 may perform such decryption in response to authenticating runtime component 102 (e.g., in response to determining that runtime component 102 is valid or authentic). (Note that in some embodiments the authentication component may, if and only if the runtime component is authenticated by the authentication component, pass a decryption key to the runtime component, and the runtime component may perform the decryption.) If the runtime component 102 is determined to be not authentic (e.g., invalid, untrusted, etc.), the authentication component may not provide decrypted content 212 to the runtime component. In various embodiments, the authentication component may determine, for each of one or more API requests, an expected response to that API request. To perform authentication process 208, authentication component 164 may submit each of the one or more API requests to the respective API of runtime component 102, as demonstrated in the illustrated embodiment. As part of authentication process 208, authentication component 164 may be configured to receive one or more responses to those requests. As part of authentication process 208, authentication component 164 may in various embodiments determine whether the one or more API response match the one or more expected responses described above. In response to determining that each of the one or more API responses matches each of the respective expected responses, authentication component 164 may determine that runtime component 102 is authenticated (e.g., valid or trusted). In response to determining that one or more of the API responses do not match the respective expected responses, authentication component 164 may determine that runtime component 102 is not authenticated (e.g., not valid, unauthentic, untrusted, etc.).

In some embodiments, as an alternative to the API check described above (or in addition to the API check), authentication component 164 may determine whether the runtime component 102 holds a particular cryptographic key. In one example, the authentication component may engage the runtime component in a handshaking protocol to determine whether the particular cryptographic key is held by the runtime component. In response to determining that the particular cryptographic key is held by the runtime component, authentication component 164 may determine that runtime component 102 is authenticated. In response to determining that the particular cryptographic key is not held by the runtime component, authentication component may determine that runtime component 102 is not authenticated.

In various embodiments, authentication process 202 and authentication process 208 may operate on different portions of API(s) 200. In this way, if a malicious application were to spoof the portion of API(s) 200 checked by DRM component 104 but not the portion of API(s) 200 checked by authentication component 164, the malicious application would be prohibited from receiving decrypted content 212. Likewise, if a malicious application were to spoof the portion of API(s) 200 checked by authentication component 164 but not the portion of API(s) 200 checked by DRM component 104, the malicious application would be prohibited from receiving decrypted content 206. In one particular example, DRM component 104 may limit the API-based authentication described to a particular API, such as a cryptographic API of runtime component 102. In this example, authentication component 164 may perform the API-based authentication on a different portion of API(s) 200. For instance, authentication component might query a windowing API and a networking API. Other examples are of course possible and contemplated. In general, the portion of API(s) 200 that are tested by authentication 164 (in accordance with authentication process 208 described above) may be different than the portion of API(s) 200 that are tested by DRM component 104 (in accordance with authentication process 202 described above).

If both authentication processes 202 and 208 are successful (e.g., if both DRM component 104 and authentication component 164 authenticate the runtime component), runtime component may receive decrypted content 206 and decrypted content 212, which combined may represent an unencrypted version of encrypted content 162. Such unencrypted version of encrypted content 162 is illustrated as decrypted content 214 in the illustrated embodiment. For instance, decrypted content 214 may be video content, audio content or any other content described herein. The runtime component may provide such decrypted content to an input/output component 216 in various embodiments. For instance, at content consumption time, the consumed content (e.g., a playing video) may be sent to input/output component 216 (which may be represented by element 950 of FIG. 6) for consumption on a peripheral device (e.g., a display). In general, the generation and/or output of decrypted content 214 may include any of the content consumption techniques described above (e.g., playing, displaying, rendering, etc.).

As one alternative to the example provided above, at least some of encrypted content 162 may include multiple layers of encryption. For instance, in one non-limiting example, every hundredth block of encrypted content may be encrypted with a first encryption key and then encrypted again with a second encryption key. In this example, all of the remaining blocks of the encrypted content may be encrypted with the first decryption key but not the second encryption key. In this example, authentication component 164 may include a decryption key corresponding to the aforesaid second encryption key and the DRM component 104 may receive a decryption key (e.g., from the content license) that corresponds to the aforesaid first decryption key. Accordingly, in this example, if authentication component decrypts every hundredth block using the decryption key held by authentication component, the result will be blocks that are still encrypted with the aforesaid first encryption key (due to the layered encryption described above). In such cases, runtime component 102 may be configured to pass such blocks to the DRM component so that they may be fully decrypted (since in this example the DRM component holds the appropriate decryption key that corresponds to the aforesaid first encryption key).

Multiple Authentication Components

Figure 3:
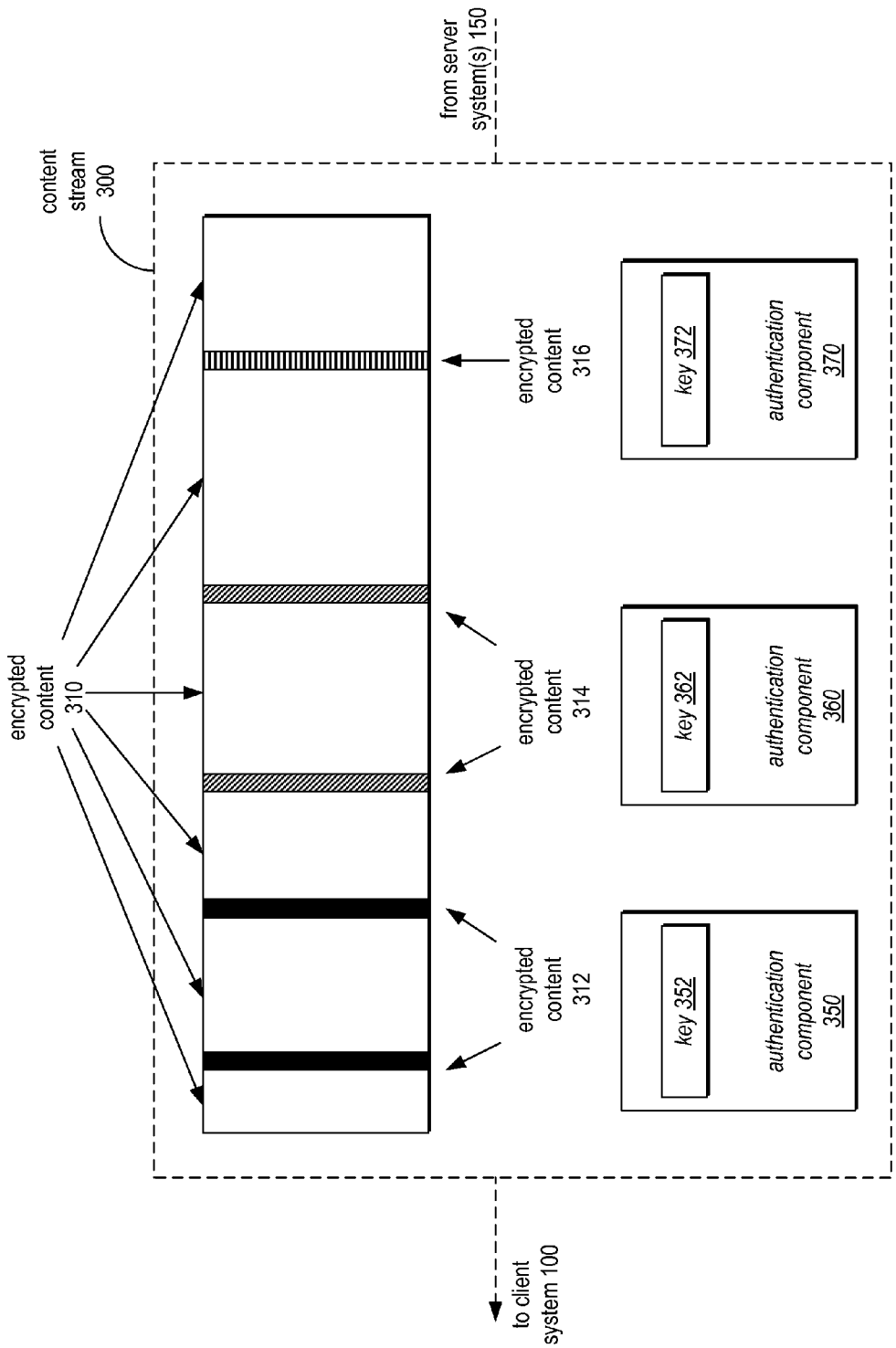
FIG. 3 illustrates a graphical representation of a content stream sent from one or more server systems to a client system, according to various embodiments.

In various embodiments, multiple authentication components may be utilized to decrypt encrypted content (e.g., a stream of encrypted content, such as a video stream). In such embodiments, distinct portions of the content stream may be encrypted with different encryption keys such that multiple authentication components (each with different decryption keys that correspond to respective ones of the aforesaid encryption keys) are required to decrypt the entire content stream. FIG. 3 illustrates one embodiment of a content stream 300 that includes an example of such content. In the illustrated embodiment, different portions of the encrypted content are encrypted with different encryption keys. Each of encrypted content 310, 312, 314 and 316 may be encrypted with different encryption keys.

Also note that for clarity of description of this section, it will be assumed that the runtime component is authentic and that each of the authentication components have or will successfully authenticate the runtime component (of course in other cases the runtime component may be invalid and the authentication components may be configured to prevent the decryption of one or more portions of content) thereby enabling decryption of one or more portions of content stream 300. Also note that each of the illustrated authentication components may be configured in a manner similar to that of authentication component 164 described above.

In the illustrated example, authentication component 350 may be the initial authentication component received by client system 100. (Content/data to the left of the content stream may be encountered by the client before content/data on the right of the content stream.) In various embodiments, a DRM component on the client system (e.g., DRM component 104) may obtain the decryption key (e.g., from content license 168) for encrypted content 310 as well as decrypt such content with the decryption key. In various embodiments, authentication component 350 may hold key 352, which may be the decryption key that corresponds to the encryption key used to encrypt encrypted content 312. Authentication component 350 may be configured to use decryption key 352 to decrypt encrypted content 312 (or pass such key to the runtime component such that the runtime component may use decryption key 352 to decrypt the content).

In some embodiments, once the client system encounters encrypted content 314, authentication component 350 may not be able to decrypt such content (e.g., since it currently does not have possession of the appropriate encryption key). To enable the client system to decrypt encrypted content 314, a new authentication component 360 may be received. In the illustrated embodiments, decryption key 362 may be the decryption key that corresponds to the encryption key used to encrypt encrypted content 314. To enable client system to decrypt encrypted content 314, authentication component 360 may be configured to decrypt such content using decryption key 362, pass decryption key 362 to the runtime component such that the runtime component is enabled to decrypt such content, pass decryption key 362 to the DRM component such that the DRM component is enabled to decrypt such content, or pass the decryption key 362 to authentication component 350 such that authentication component 350 is enabled to decrypt the content. Techniques similar to those described above may be utilized to decrypt encrypted content 316 with authentication component 370 and decryption key 372 (note that decryption key 372 may correspond to the encryption key used to encrypt encrypted content 316). In some embodiments, subsequent authentication components of the content stream are encrypted and must be decrypted by an existing authentication component when received at the client system. In some embodiments, one or more of the authentication components of the illustrated content stream 300 may require that the client system provide user credentials (e.g., a username, password, and/or digital certificate) in order to decrypt and/or consume the content via the runtime component.

In some embodiments (not illustrated), the manner in which the content is encrypted may require overlap in the decryption of two or more authentication components. For instance, a particular portion of the content stream may be encrypted with both two encryptions, one which corresponds to decryption key 352 and another that corresponds to decryption key 362. In this example, use of both authentication component 350 and authentication component 360 may be required to decrypt that particular portion of content. For instance, each authentication component may decrypt the particular portion of content using its respective decryption key, one authentication component could pass its key to the other authentication component to enable decryption, or both authentication components could pass their respective keys to the runtime component to enable the runtime component to decrypt the particular portion of content. In various embodiments, the utilization of different keys as illustrated in FIG. 3 may bolster the security of the overall content stream. For instance, if an attacker were to crack the decryption key for one of the authentication components, such security compromise would be limited to content associated with that key. In this example, content associated with keys that have not been compromised would be secure.

Also note that each authentication component may in various embodiments be configured to test a different portion of API(s) 200. Such diversity among the different authentication components may strengthen the security of the content stream. For instance, if an attacker were to compromise one of the illustrated authentication components (e.g., by spoofing the runtime component), that security compromise would be limited to that particular authentication component in various embodiments. More specifically, even were a malicious application to spoof the APIs probed by one authentication component, such security compromise would not extend to a second authentication components that probes different APIs. For instance, if the spoofing application failed the API-based authentication of the second authentication component, that authentication component may prevent the decryption of a portion of the content stream (e.g., by not performing that decryption or by withholding the decryption key from other components).

In various embodiments, the use of multiple different authentication components, the diversity of the decryption keys used by the authentication components and/or the diversity of APIs that are tested by the authentication components may improve the overall security of the content stream. For example, such techniques may make the overall content stream a moving target for an attacker by isolating security compromises to only a portion of the overall content stream.

In some embodiments, authentication component distributor 154 may be configured to enhance the diversity described above. For instance, as described above, encrypted content may specify a network location (e.g., URL) from which an authentication component 164 may be obtained. Such network location may be controlled by distributor 154. For instance, distributor 154 may be configured to change the particular authentication component associated with that network location. In one example, for any given client request for the network location, the distributor 154 may be configured to select an authentication component from a repository of different authentication components (e.g., authentication components that test different portions of API(s) 200) and provide the selected authentication component to the client system in response to that request. In some embodiments, the selection of the authentication component from the repository may be a random or pseudo-random process. To further improve the diversity of the authentication components utilized in various embodiments, the quantity of authentication components within the repository may be very large relative to the quantity of authentication components required to decrypt a content stream.

Obfuscation

In various embodiments, any of the components, elements and/or data described herein may be obfuscated, such as by modifying the data that represents such items with an obfuscation tool. In various embodiments, such an obfuscation tool may be configured to obfuscate data, bytecode, and/or machine code (or other executable instructions). In one example, any of the authentication components or decryption keys described herein may be obfuscated prior to using such elements in the above-described implementations. Obfuscating the aforesaid items may enhance the overall security of various embodiments by, e.g., concealing the purpose of executable code in order to deter reverse engineering. In various embodiments, the security techniques described herein may cause different portions of data (e.g., content or encryption keys) to be distributed across multiple memory buffers (e.g., only a portion of such data may be available in memory at any given time) such that a memory inspection or debugging session will not result in a security compromise of those portions of data.

Example Methods

The system and method for multipronged authentication may include various methods, some of which are described below with respect to FIGS. 4 and 5. In various embodiments, the methods illustrated may be performed by the computer system of FIG. 6, which is described below.

Figure 4A:
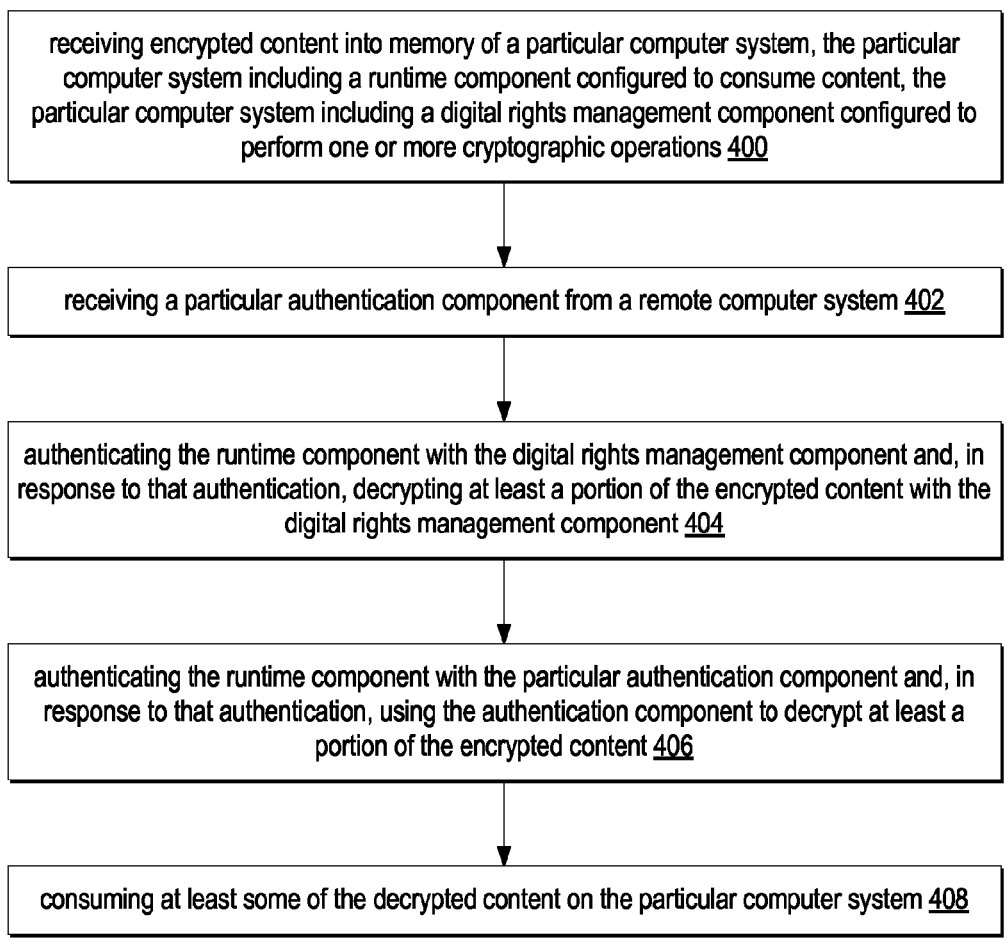
FIGS. 4A-B illustrate flowcharts of example methods for authentication of a runtime component and decryption of content, according to some embodiments.

FIG. 4A illustrates an example method for authentication of a runtime component and decryption of content, according to some embodiments. In some embodiments, the illustrated method may be performed by client system 100 described above. As illustrated by block 400, the method may include receiving encrypted content into memory of a particular computer system (e.g., receiving the encrypted content into memory of that computer system). In various embodiments, the particular computer system may include a runtime component configured to consume content (e.g., runtime component runtime component 102 described above) as well as a digital rights management component configured to perform one or more cryptographic operations (e.g., DRM component 104 described above). Examples of receiving content include but are not limited to downloading content (e.g., a content file or stream of content) from a network location on a remote computer system. One example of the receipt of such content is described above with respect to the receipt of encrypted content 162 by client system 100.

As illustrated by block 402, the method may include receiving a particular authentication component from a remote computer system. An example of such an authentication component may include but is not limited to any of the authentication components described above, such as authentication component 164 or authentication components 350, 360 and 370. One example of the receipt of an authentication component from a remote computer system is illustrated by the receipt of authentication component 164 from server system(s) 150 described above. In some embodiments, the method may include receiving the encrypted content and the authentication component together, such as in the same file or content stream.

As illustrated by block 404, the method may include authenticating the runtime component with (i.e., by utilizing) the digital rights management component and, in response to that authentication, decrypting at least a portion of the encrypted content with the digital rights management component. In various embodiment of the method, if the runtime component is determined to be not authentic (e.g., invalid, such as a malicious application), the method may include prohibiting the decryption of at least a portion of the encrypted content with the DRM component. One example of the aforesaid decryption is described above with respect to DRM component 104 decrypting encrypted content 204 (which may be at least a portion of encrypted content 162). For instance, in various embodiments, the method may include using a DRM component to access a decryption key from a content license and using that decryption key to decrypt at least a portion of the encrypted content in order to generate decrypted content. In various embodiments, the runtime component may include one or more APIs (e.g., API(s) 200), and the method may include utilizing the API-based authentication techniques described above to determine that the runtime component is authentic (or not authentic, in some cases). In some cases, runtime component may include a cryptographic key, and authenticating the runtime component in these cases may include the DRM component verifying that cryptographic key.

As illustrated by block 406, the method may also include authenticating the runtime component with the particular authentication component and, in response to that authentication, using the authentication component to decrypt at least a portion of the encrypted content. In various embodiment of the method, if the runtime component is determined to be not authentic (e.g., invalid, such as a malicious application), the method may include prohibiting the decryption of at least a portion of the encrypted content with the authentication component. One example of the aforesaid decryption is described above with respect to authentication component 164 decrypting encrypted content 210 (which may be at least a portion of encrypted content 162). In various embodiments, the runtime component may include one or more APIs (e.g., API(s) 200), and the method may include utilizing the API-based authentication techniques of the authentication component described above in order to determine that the runtime component is authentic (or not authentic, in some cases). In some cases, runtime component may include a cryptographic key, and authenticating the runtime component in these cases may include the authentication component verifying that cryptographic key.

In various embodiments, using the authentication component to decrypt at least a portion of the encrypted content in accordance with block 406 may include the authentication component decrypting at least a portion of the encrypted content with decryption logic of the authentication component. For instance, any of the authentication components described herein may be configured to perform any of a variety of decryption process (e.g., symmetric decryption, asymmetric decryption, or some other decryption process or combination thereof) and use such decryption processes to decrypt encrypted content (in response to determining that the runtime component is authentic). In various other embodiments, the runtime component may include similar decryption logic and using the authentication component to decrypt at least a portion of the decrypted content may include causing the authentication component to provide a decryption key to the runtime component such that the runtime component is enabled to decrypt at least a portion of the encrypted content (e.g., since that decryption key may correspond to the encryption key used to encrypt the content).

Note that in various embodiments of the method, the portion of the runtime component authenticated by the DRM component and the portion of the runtime component authenticated by the authentication component. For instance, the method may include using one component to perform API-based authentication (described above) on one set of APIs and using the other component to perform API-based authentication on another set of APIs. In some cases, the method may include using one component to evaluate functions or libraries of the APIs different than those evaluated by the other component.

As illustrated by block 408, the method may also include consuming at least a portion of the decrypted content (e.g., content decrypted by the DRM component, content for which decryption was caused by the authentication component, or some combination thereof) on the particular computer system. For instance, the method may include rendering or playing some the decrypted content or using any other technique for content consumption as described above. In various embodiments, consuming the content may include providing unencrypted content to an external or peripheral device (e.g., a computer display) for consumption on that device.

In various embodiments, the method may also include receiving multiple different authentication components, such as described above with respect to FIG. 3. For instance, in various embodiments, different portions of the content stream may be encrypted with different encryption keys; each of such portions may be decrypted with a respect authentication component that holds the respective decryption key.

Figure 4B:
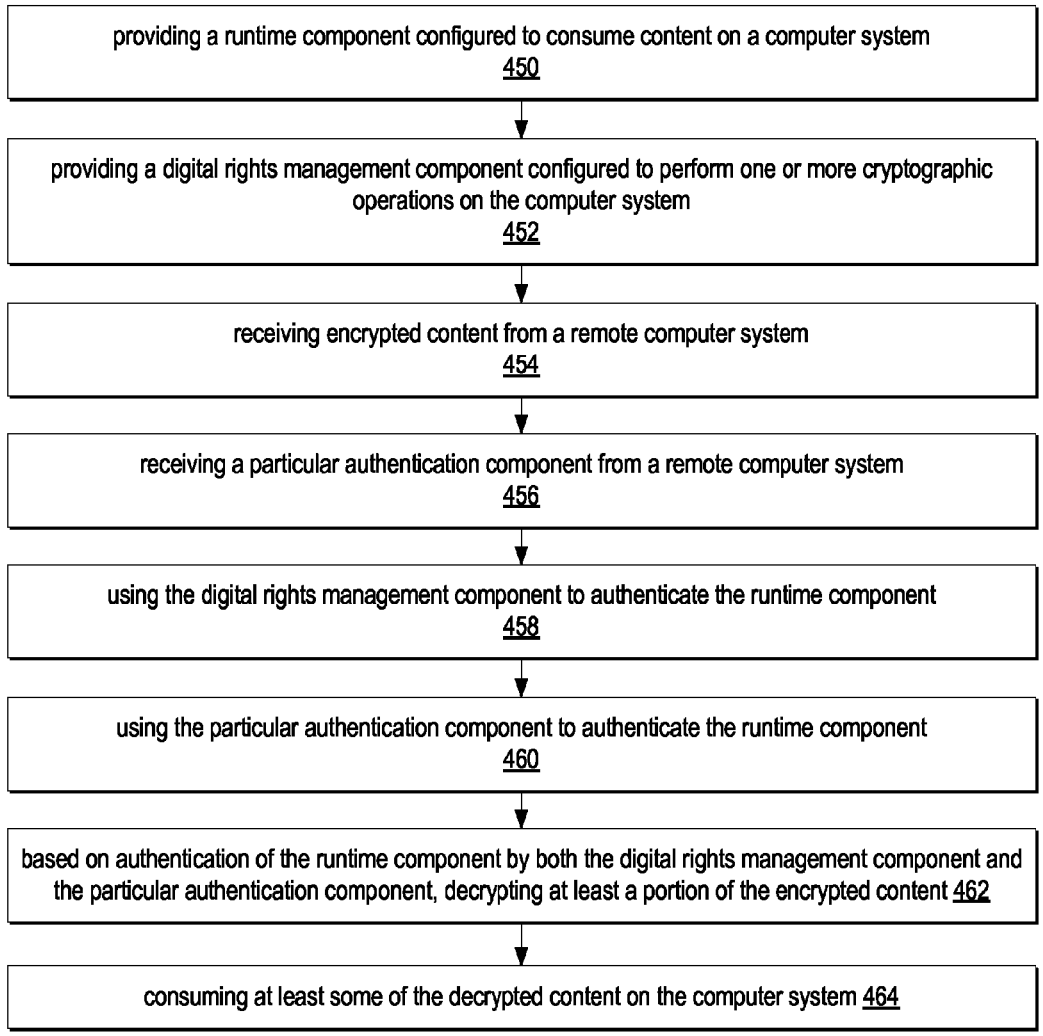

While the flowchart of FIG. 4A illustrates an example method that includes decryption of content by both the digital rights management component and the authentication component, various embodiments may not necessarily adhere to such decryption techniques. For instance, FIG. 4B illustrates one example of a method where the decryption of content may be performed by the digital rights management component, by the runtime component, by the authentication component, or some combination thereof. In various embodiments, FIG. 4B may be performed by client system 100 described above.

As illustrated by block 450, the method may include providing a runtime component configured to consume content on a computer system. For instance, providing such a runtime component may include providing a runtime component similar to or the same as runtime component 102 described above. As illustrated by block 452, the method may also include providing a digital rights management component configured to perform one or more cryptographic operations on the computer system. For instance, providing such a digital rights management component may include providing a digital rights management component similar to or the same as DRM component 104 described above. As illustrated by blocks 454 and 456, the method may also include receiving encrypted content and receiving a particular authentication component, such as described above with respect to blocks 400 and 402 of FIG. 4A.

The method may also include using the digital rights management component to authenticate the runtime component (block 458) and using the particular authentication component to authentication the runtime component (block 460). For instance, either of such authentication may include using the API-based authentications described above and/or using the verification of a cryptographic key held by the runtime component as described above.

As illustrated by block 462, the method may include, based on the authentication of the runtime component by both the digital rights management component and the particular authentication component, decrypting at least a portion of the encrypted content. In various embodiments, performing such decryption may be performed by the digital rights management component, by the runtime component, by the authentication component, or some combination thereof, as described in more detail below.

In some embodiments, decrypting at least a portion of the encrypted content may include the digital rights management component and the particular authentication component decrypting respective portions of the encrypted content, such as described above with respect to FIG. 4A. In some embodiments, decrypting at least a portion of the encrypted content may include the digital rights management component and the particular authentication component decrypting at least some of the same portions of content, such as described above in embodiments where encrypted content 162 includes multiple layers of encryption. In some embodiments, the runtime component may receive a decryption key from the authentication component and/or the digital rights management component, and decrypting at least a portion of the decrypted content may include the runtime component decrypting that portion of content with such key(s). In some embodiments, the digital rights management component may receive a decryption key from the authentication component (e.g., subsequent to the authentication component successfully authenticating the runtime component), and decrypting at least a portion of the decrypted content may include the digital rights management component decrypting the content with such key.

Note that in various embodiments, irrespective of which decryption techniques is utilized, decryption of all of the content may be based upon both the authentication component and the digital rights management component authenticating the runtime component (e.g., such as described above with respect to authentication processes 202 and 208). In some cases, if only one of the digital rights management component and the authentication component authenticate the runtime component, that component may in some cases be utilized to decrypt a portion of (but not the entirety of) the encrypted content. However, at least some of the encrypted content would not be able to be decrypted in this particular scenario. For example, if the digital rights management component authenticated the runtime component and the authentication component did not authenticate the runtime component, the digital rights management component might decrypt a portion of the content for which it holds key. However, in such a scenario, the runtime component may perform one or more techniques to prevent the decryption of at least some of the content. For instance, in embodiments where the authentication component is responsible for decrypting content with its own decryption logic, the authentication component may refrain from performing such decryption. In embodiments where the authentication component is responsible for passing a key to another component (e.g., the digital right management component or the runtime component) to enable that component to decrypt the content, the authentication component may withhold such key from that component in order to prevent decryption of at least some of the content.

Figure 5:
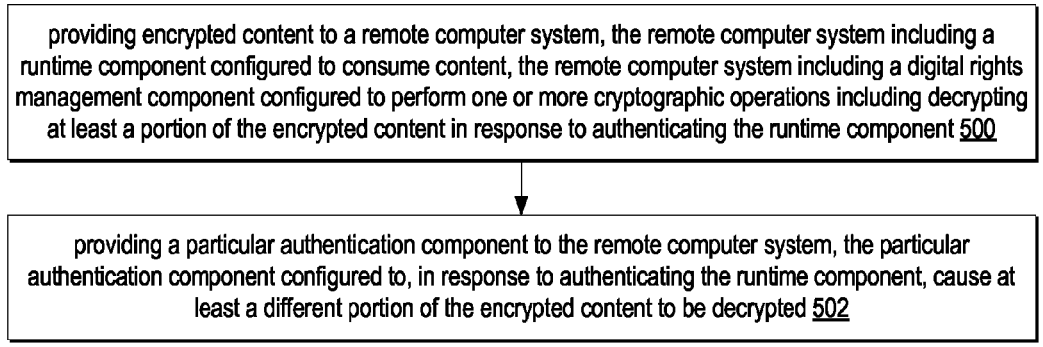
FIG. 5 illustrates a flowchart of an example method for providing encrypted content and a corresponding authentication component, according to some embodiments.

FIG. 5 illustrates an example method for providing encrypted content and a corresponding authentication component, according to some embodiments. In some embodiments, the illustrated method may be performed by one or more of server system(s) 150 described above. As illustrated by block 500, the method may include providing encrypted content to a remote computer system. In various embodiments, the remote computer system may include a runtime component (e.g., runtime component 102) configured to consume content as well as a digital rights management component (e.g., DRM component 104) configured to perform one or more cryptographic operations including decrypting at least a portion of the encrypted content in response to authenticating the runtime component. One example of providing encrypted content to a remote computer system is described above with respect to server system(s) 150 providing encrypted content 162 to client system 100.

As illustrated by block 502, the method may also include providing a particular authentication component (any of the authentication components described herein) to the remote computer system. In various embodiments, the particular authentication component that is provided may be configured to, in response to authenticating the runtime component, cause at least a portion of the encrypted content to be decrypted. In various embodiments, to cause at least a portion of the encrypted content to be decrypted may include the authentication component decrypting at least a portion of the encrypted content with decryption logic of the authentication component. In various other embodiments, the runtime component may include similar decryption logic and the authentication component may cause content to be decrypted by providing a decryption key to the runtime component such that the runtime component is enabled to decrypt at least a portion of the encrypted content (e.g., since that decryption key may correspond to the encryption key used to encrypt the content).

In various embodiment of the method, the particular encrypted content that is provided may be encrypted such that the entirety of the particular encrypted content cannot be decrypted on the remote computer system without the remote computer system using both the digital rights management component and the authentication component to authenticate the runtime component. For instance, as described above in reference to multiple examples, some portions of the content may be encrypted with an encryption key that corresponds to a decryption key accessible to the DRM component (e.g., a decryption key the DRM component obtains from a content license) and other portions of the content may be encrypted with an encryption key that corresponds to a decryption key held by the authentication component. An example of content generate according to these techniques is illustrated by the content of content stream 300 described above. Additionally, various techniques by which the authentication component may prevent decryption of at least some of the encrypted content (e.g., if at least one of the DRM component and the authentication component do not authenticate the runtime component) are described above with respect to FIG. 4B.

As described above, different portions of the encrypted content may be encrypted with different encryption keys. In various embodiments, the method may also include providing such keys to the remote computer system. For instance, the method may include providing the DRM component with a content decryption key for decryption some portion of the content. In some cases, providing such key may include providing the key as part of content license for the content. In various embodiments, the method may include providing another decryption to the remote computer system such that the authentication component of the remote computer system may decrypt portions of the encrypted content. In various embodiments, the method may also include providing additional authentication components as well as corresponding decryption keys that may be utilized by such components to decrypt portions of the encrypted content. In one example providing content encrypted with different keys as well as providing authentication components with respective decryption keys to decrypt the content may be implemented by providing a content stream that includes such elements, such as a content stream similar to content stream 300.

Additional Embodiments

Also note that while embodiments described herein largely refer to multipronged authentication of a runtime component, various embodiments may utilize similar techniques for multipronged authentication in order to authenticate other elements. In one example, a web browser (and/or associated plug-ins) may operate in a mode with restricted privileges. While operating in such a mode, the web browser may be prevented from performing certain operations (e.g., privileged operations, such as performing a system call). To perform such operations, the web browser may be required to call a process with higher privileges. In this example, the process with higher privileges may utilize the multipronged authentication techniques described herein in order to authenticate the web browser. Other examples are possible and contemplated in various embodiments.

Example Computer System

Various embodiments of a system and method for multipronged authentication, as described herein, may be executed on one or more computer systems, which may interact with various other devices. One such computer system is computer system 900 illustrated by FIG. 9, which may in various embodiments implement any of the elements or functionality illustrated in FIGS. 1-5. In various embodiments, computer system 900 may be configured to implement client system 100 described above. In some embodiments, computer system 900 may be configured to implement one or more of server system(s) 150 described above. Computer system 900 may be configured to implement runtime component 102, DRM component 104, and/or authentication component 164, each of which may be stored in memory as processor-executable executable program instructions 922 (e.g., program instructions executable by processor(s) 910) in various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, data 932 may include encrypted content 102, content license 168, and decrypted content 214. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the DRM framework described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 800), such as one or more server system(s) 150, or between nodes of computer system 900. In various embodiments, network 800 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the method illustrated by FIGS. 4A, 4B, and 5. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
   providing a runtime component configured to consume content on a computer system;
   providing a digital rights management component, the digital rights management component configured to, provide at least one first cryptographic key;
   receiving encrypted content from a remote computer system;
   receiving a first authentication component from the remote computer system, the authentication component configured to provide at least one second cryptographic key;
   using the digital rights management component to authenticate the runtime component;
   using the first authentication component to authenticate the runtime component;
   based on authentication of the runtime component by both the digital rights management component and the authentication component, decrypting at least a portion of the encrypted content utilizing the at least one first cryptographic key and the at least one second cryptographic key; and
   consuming at least some of the decrypted content on the computer system.

2. The computer-implemented method of claim 1, wherein decrypting at least a portion of the encrypted content comprises decrypting at least a portion of the encrypted content using one or more of: the digital rights management component, the runtime component, and the first authentication component.

3. The computer-implemented method of claim 2, wherein using the first authentication component to decrypt at least a portion of the encrypted content comprises causing the first authentication component to provide the at least one second cryptographic key to one or more of: the runtime component and the digital rights management component.

4. The computer-implemented method of claim 1, wherein the runtime component is configured to provide one or more application programming interfaces, wherein using the first authentication component to authenticate the runtime component comprises authenticating a particular portion of the one or more application programming interfaces of the runtime component.

5. The computer-implemented method of claim 4, wherein using the digital rights management component to authenticate the runtime component comprises authenticating a different portion of the one or more application programming interfaces.

6. The computer-implemented method of claim 4, wherein authenticating the particular portion of the one or more application programming interfaces comprises using the first authentication component to:
send one or more messages to the one or more application programming interfaces of the runtime component;
receive one or more responses to the one or more messages from the one or more application programming interfaces; and
determine that each response of said one or more responses matches an expected response determined by the first authentication component.

7. The computer-implemented method of claim 1, wherein the encrypted content and one or more authentication components are received together in one or more of: a content stream and a data file; wherein said one or more authentication components include the first authentication component.

8. The computer-implemented method of claim 1, wherein the computer system includes said runtime component and said digital rights management component prior to receipt of the encrypted content and the first authentication component.

9. The computer-implemented method of claim 1, further comprising:
receiving a second authentication component; and
using the second authentication component to authenticate the runtime component and, in response to that authentication, decrypting one or more additional portions of the encrypted content utilizing at least one third cryptographic key.

10. The computer-implemented method of claim 9, wherein multiple portions of said encrypted content are each encrypted with a different encryption key; wherein said decrypting at least a portion of the encrypted content comprises decrypting a particular portion of the encrypted content with the at least one second cryptographic key provided by the first authentication component; wherein decrypting one or more additional portions of the encrypted content comprises decrypting a different portion of the encrypted content with the at least one third cryptographic key provided by the second authentication component.

11. The computer-implemented method of claim 1, wherein the first authentication component is received in an obfuscated form, wherein the obfuscated form of the first authentication component is generated by an obfuscation tool configured to obfuscate one or more of: data, bytecode, and machine code.

12. The computer-implemented method of claim 1, wherein the first authentication component is received from the remote computer system during runtime execution of the encrypted content.

13. The computer-implemented method of claim 1, wherein the first authentication component is received with the encrypted content.

14. A computer-implemented method, comprising:
providing encrypted content to a remote computer system, the remote computer system including a runtime component configured to consume content, the remote computer system including a digital rights management component configured to provide at least one first cryptographic key, decrypting at least a portion of the encrypted content utilizing the at least one first cryptographic key in response to authenticating the runtime component; and providing an authentication component to the remote computer system, wherein the authentication component is configured to provide at least one second cryptographic key and, in response to authenticating the runtime component, cause at least a portion of the encrypted content to be decrypted utilizing the at least one second cryptographic key;
wherein said encrypted content is encrypted such that the entirety of the encrypted content cannot be decrypted on the remote computer system without the remote computer system using both the digital rights management component and the authentication component to authenticate the runtime component and utilizing the at least one first cryptographic key and at least one second cryptographic key to decrypt the content.

15. The computer-implemented method of claim 14, wherein multiple portions of the encrypted content are each encrypted with a different encryption key; wherein the method comprises providing the at least one first cryptographic key for a first portion of the encrypted content to the digital rights management component of the remote computer system.

16. The computer-implemented method of claim 15, wherein providing the at least one first cryptographic key for the first portion of the encrypted content to the digital rights management component comprises providing a content license for the first portion of the encrypted content to the digital rights management component, the content license including the at least one first cryptographic key.

17. The computer-implemented method of claim 16, wherein the at least one second cryptographic key is provided within the content license in an encrypted form, wherein the authentication component is configured to decrypt the at least one second cryptographic key.

18. The computer-implemented method of claim 15, wherein the method comprises providing to the remote computer system the at least one second cryptographic key for a second portion of the encrypted content, wherein the authentication component is configured to cause the decryption of the second portion of the encrypted content with the at least one second cryptographic key.

19. A system, comprising:
a memory; and
one or more processors coupled to the memory, wherein the memory comprises program instructions executable by the one or more processors to:
implement a runtime component in said memory, the runtime component configured to consume content;

implement a digital rights management component in said memory, the digital rights management component configured to provide at least one first cryptographic key, the digital rights management component further configured to authenticate the runtime component;

receive encrypted content from a remote computer system;

receive a first authentication component from the remote computer system, the first authentication component configured to provide at least one second cryptographic key and to authenticate the runtime component;

based on authentication of the runtime component by both the digital rights management component and the first authentication component, decrypt at least a portion of the encrypted content utilizing the at least one first cryptographic key and the at least one second cryptographic key; and consume at least some of the decrypted content on the computer system.

20. The system of claim 19, wherein to decrypt at least a portion of the encrypted content the program instructions are configured to decrypt at least a portion of the encrypted content using one or more of: the digital rights management component, the runtime component, and the first authentication component.

21. The system of claim 20, wherein to use the first authentication component to decrypt at least a portion of the encrypted content the program instructions are configured to cause the first authentication component to provide the at least one second cryptographic key to one or more of: the runtime component and the digital rights management component.

22. The system of claim 19, wherein the runtime component is configured to provide one or more application programming interfaces, wherein to authenticate the runtime component the first authentication component is configured to authenticate a particular portion of the one or more application programming interfaces of the runtime component.

23. The system of claim 22, wherein to authenticate the runtime component the digital rights management component is configured to authenticate a different portion of the one or more application programming interfaces.

24. The system of claim 22, wherein to authenticate the particular portion of the one or more application programming interfaces the first authentication component is configured to:
send one or more messages to the one or more application programming interfaces of the runtime component; and
receive one or more responses to the one or more messages from the one or more application programming interfaces; and determine that each response of said one or more responses matches an expected response determined by the first authentication component.

25. The system of claim 19, wherein the program instructions are configured to receive the encrypted content and one or more authentication components together in one or more of: a content stream and a data file; wherein said one or more authentication components include the first authentication component.

26. The system of claim 19, wherein said runtime component and said digital rights management component are present on the system prior to receipt of the encrypted content and the first authentication component.

27. The system of claim 19, wherein the program instructions are configured to:

receive a second authentication component, the second authentication component configured to provide at least one third cryptographic key and to authenticate the runtime component; and in response to the second authentication authenticating the runtime component, decrypt one or more additional portions of the encrypted content utilizing the at least one third cryptographic key.

28. The system of claim 27, wherein multiple portions of said encrypted content are each encrypted with a different encryption key; wherein to decrypt at least a portion of the encrypted content the program instructions are configured to decrypt a particular portion of the encrypted content with the at least one second cryptographic key provided by the first authentication component; wherein to decrypt one or more additional portions of the encrypted content the program instructions are configured to decrypt a different portion of the encrypted content with at least one third cryptographic key provided by the second authentication component.

29. The system of claim 19, wherein the first authentication component is received in an obfuscated form, wherein the obfuscated form of the first authentication component is generated by an obfuscation tool configured to obfuscate one or more of: data, bytecode, and machine code.

30. A system, comprising:
a memory; and
one or more processors coupled to the memory, wherein the memory comprises program instructions executable by the one or more processors to:
provide encrypted content to a remote computer system, the remote computer system including a runtime component configured to consume content, the remote computer system including a digital rights management component configured to provide at least one first cryptographic key, decrypting at least a portion of the encrypted content utilizing the at least one first cryptographic key in response to authenticating the runtime component; and provide an authentication component to the remote computer system, wherein the authentication component is configured to provide at least one second cryptographic key and, in response to authenticating the runtime component, cause at least a portion of the encrypted content to be decrypted utilizing the at least one second cryptographic key;
wherein the encrypted content is encrypted such that the entirety of the encrypted content cannot be decrypted on the remote computer system without the remote computer system using both the digital rights management component and the authentication component to authenticate the runtime component and utilizing the at least one first cryptographic key and the at least one second cryptographic key to decrypt the content.

31. The system of claim 30, wherein multiple portions of the encrypted content are each encrypted with a different encryption key; wherein the program instructions are configured to provide the at least one first cryptographic key for a first portion of the encrypted content to the digital rights management component of the remote computer system.

32. The system of claim 31, wherein to provide the at least one first cryptographic key for the first portion of the encrypted content to the digital rights management component the program instructions are configured to provide a content license for the first portion of the encrypted content to the digital rights management component, the content license including the at least one first cryptographic key.

33. The system 30, wherein the at least one first cryptographic key is provided within the content license in an encrypted form, wherein the authentication component is configured to decrypt the at least one first cryptographic key.

34. The system of claim 31, wherein the program instructions are configured to provide to the remote computer system, at least one second cryptographic key for a second portion of the encrypted content; wherein the authentication component is configured to cause the decryption of the second portion of the encrypted content with the at least one second cryptographic key.

35. A non-transitory computer-readable storage medium, storing program instructions computer-executable on a computer system to:
   implement a runtime component in memory of that computer system, the runtime component configured to consume content;
   implement a digital rights management component in said memory, the digital rights management component configured to provide at least one first cryptographic key, the digital rights management component further configured to authenticate the runtime component;
   receive encrypted content from a remote computer system;
   receive a first authentication component from a remote computer system, the first authentication component configured provide at least one second cryptographic key, the first authentication component further configured to authenticate the runtime component;
   based on authentication of the runtime component by both the digital rights management component and the first authentication component, decrypt, utilizing the at least one first cryptographic key and the at least one second cryptographic key, at least a portion of the encrypted content; and consume at least some of the decrypted content on the computer system.

36. The medium of claim 35, wherein to decrypt at least a portion of the encrypted content the program instructions are configured to decrypt at least a portion of the encrypted content using one or more of: the digital rights management component, the runtime component, and the first authentication component.

37. The medium of claim 36, wherein to use the first authentication component to decrypt at least a portion of the encrypted content the program instructions are configured to cause the first authentication component to provide the at least one second cryptographic key to one or more of: the runtime component and the digital rights management component.

38. The medium of claim 35, wherein the runtime component is configured to provide one or more application programming interfaces, wherein to authenticate the runtime component the first authentication component is configured to authenticate a particular portion of the one or more application programming interfaces of the runtime component.

39. The medium of claim 38, wherein to authenticate the runtime component the digital rights management component is configured to authenticate a different portion of the one or more application programming interfaces.

40. The medium of claim 38, wherein to authenticate the particular portion of the one or more application programming interfaces the first authentication component is configured to:
   send one or more messages to the one or more application programming interfaces of the runtime component;
   receive one or more responses to the one or more messages from the one or more application programming interfaces; and determine that each response of said one or more responses matches an expected response determined by the first authentication component.

41. The medium of claim 35, wherein the program instructions are configured to receive the encrypted content and one or more authentication components together in one or more of: a content stream and a data file; wherein said one or more authentication components include the first authentication component.

42. The medium of claim 35, wherein said runtime component and said digital rights management component are present on the system prior to receipt of the encrypted content and the first authentication component.

43. The medium of claim 35, wherein the program instructions are configured to:
   receive a second authentication component, the second authentication component configured provide at least one third cryptographic key and further configured to authenticate the runtime component; and
   in response to the second authentication authenticating the runtime component, decrypt one or more additional portions of the encrypted content utilizing the at least one third cryptographic key.

44. The medium of claim 43, wherein multiple portions of said encrypted content are each encrypted with a different encryption key; wherein to decrypt at least a portion of the encrypted content the program instructions are configured to decrypt a particular portion of the encrypted content with the at least one second cryptographic key provided by the first authentication component; wherein to decrypt one or more additional portions of the encrypted content the program instructions are configured to decrypt a different portion of the encrypted content with the at least one third cryptographic key provided by the second authentication component.

45. The medium of claim 35, wherein the first authentication component is received in an obfuscated form, wherein the obfuscated form of the first authentication component is generated by an obfuscation tool configured to obfuscate one or more of: data, bytecode, and machine code.

46. A non-transitory computer-readable storage medium, storing program instructions computer-executable on a computer system to:
   provide encrypted content to a remote computer system, the remote computer system including a runtime component configured to consume content, the remote computer system including a digital rights management component configured to provide at least one first cryptographic key and further configured to perform one or more cryptographic operations including decrypting at least a portion of the encrypted content in response to authenticating the runtime component, the decrypting utilizing the at least one first cryptographic key; and
   provide a authentication component to the remote computer system, wherein the authentication component is configured to provide at least one second cryptographic key and further configured to, in response to authenticating the runtime component, cause at least a portion of the encrypted content to be decrypted utilizing the at least one second cryptographic key;
   wherein the encrypted content is encrypted such that the entirety of the encrypted content cannot be decrypted on the remote computer system without the remote computer system using both the digital rights management component and the authentication component to authenticate the runtime component and without using both the at least one first cryptographic key and the at least one second cryptographic key to decrypt the encrypted content.

47. The medium of claim 46, wherein multiple portions of the encrypted content are each encrypted with a different encryption key; wherein the program instructions are configured to provide the at least one first cryptographic key for a first portion of the encrypted content to the digital rights management component of the remote computer system.

48. The medium of claim 47, wherein to provide the at least one first cryptographic key for the first portion of the encrypted content to the digital rights management component the program instructions are configured to provide a content license for the first portion of the encrypted content to the digital rights management component, the content license including the at least one first cryptographic key.

49. The medium 48, wherein the at least one second cryptographic key is provided within the content license in an encrypted form, wherein the authentication component is configured to decrypt the at least one second cryptographic key.

50. The medium of claim 47, wherein the program instructions are configured to provide to the remote computer system, at least one third cryptographic key for a second portion of the encrypted content; wherein the authentication component is configured to cause the decryption of the second portion of the encrypted content with the at least one third cryptographic key.

* * * * *

UNITED STATES PATENT AND TRADEMARK OFFICE
CERTIFICATE OF CORRECTION

| | | |
|---|---|---|
| PATENT NO. | : 9,027,143 B1 | Page 1 of 1 |
| APPLICATION NO. | : 12/548310 | |
| DATED | : May 5, 2015 | |
| INVENTOR(S) | : Sunil C. Agrawal and Joseph D. Steele | |

It is certified that error appears in the above-identified patent and that said Letters Patent is hereby corrected as shown below:

In the Claims

Column 29, Claim 49, Line 14

Insert the word --of claim-- right before the number 48

Signed and Sealed this
First Day of September, 2015

Michelle K. Lee
*Director of the United States Patent and Trademark Office*